United States Patent [19]

Neuhaus et al.

[11] 4,389,472

[45] Jun. 21, 1983

[54] PROCESS FOR THE PRODUCTION OF DOCUMENTS WHICH CANNOT BE FALSIFIED

[75] Inventors: Karl-Friedrich Neuhaus; Hans J. Rosenkranz; Hermann Perrey, all of Krefeld, Fed. Rep. of Germany

[73] Assignee: Agfa-Gevaert Aktiengesellschaft, Leverkusen, Fed. Rep. of Germany

[21] Appl. No.: 216,852

[22] Filed: Dec. 16, 1980

[30] Foreign Application Priority Data

Dec. 24, 1979 [DE] Fed. Rep. of Germany ....... 2952322
Jul. 22, 1980 [DE] Fed. Rep. of Germany ....... 3027759

[51] Int. Cl.³ .......................... B32B 7/04; G03C 1/87
[52] U.S. Cl. .................................... 430/10; 156/275.5; 156/275.7; 156/307.3; 156/307.7; 283/70; 283/72; 354/105; 428/200; 428/203; 428/211; 428/320.2; 428/321.5; 428/483; 428/515; 428/516; 428/518; 428/520; 428/916; 430/14; 430/18

[58] Field of Search ................ 40/2.2; 156/272, 272.2, 156/272.5, 275.7, 307.1, 307.3, 307.7, 328, 330, 331, 331.7, 332; 428/203, 204, 414, 916, 195, 199–201, 207, 211, 320.2, 321.5, 345, 349, 354, 355, 424, 425, 480, 483, 515 516, 518, 520, 522, 523, 537; 430/10, 14, 18; 283/7, 8 R, 9 R; 354/105

[56] References Cited

U.S. PATENT DOCUMENTS 3,871,119  3/1975  Mayer ..................................... 40/2.2
4,097,279  6/1978  Whitehead ............................. 40/2.2
4,246,307  1/1981  Trautwein ............................ 428/916

Primary Examiner—Bruce H. Hess
Attorney, Agent, or Firm—Connolly and Hutz

[57] ABSTRACT

The process relates to the production of tamperproof documents by laminating an information carrier on one or both sides with foils which have an adhesive layer which is hardened by radical cross-linking.

24 Claims, No Drawings

PROCESS FOR THE PRODUCTION OF DOCUMENTS WHICH CANNOT BE FALSIFIED

This invention relates to a process for the production of tamperproof documents by laminating an information carrier with plastics foil on one or both sides.

Documents which are tamperproof or cannot be falsified are becoming of increasing importance. They are used, for example, in the form of credit cards by banks, retail stores, oil companies, airlines and industrial finance companies to facilitate cash-free transactions. Such documents contain information referring both to the owner of the document and to the authority issuring the document and in the interests of both parties they are required to be proof against falsification. There have therefore been many attempts to make such information carriers tamperproof.

It is known, for example, to produce a laminate in which a card carrying printed information is inserted between two foils. Each laminating foil is treated in certain areas so that in these areas it will not adhere to the paper surface of the card. If any attempt is made to strip the laminating foil from the card the tear will, on reaching the previously prepared areas, follow the line of least resistance and therefore shift to the paper surface so that the paper tears (German Offenlegungsschrift No. 2,511,367).

According to another proposal, a printed information carrier in the form of a so-called "composited inlet" consisting of a paper card with a foil edging is sealed in between two transparent foils. The foil edging enables the edges of the paper card to be sealed in, thereby making it more difficult to split open the welded card (German Offenlegungsschrift No. 2,756,691).

One disadvantage of the known laminating processes is that when the foils used for this purpose are sealed to the paper, they are only incompletely bonded to the paper surface of the information carrier and therefore provide only limited protection against falsification. The seal round the edges only provideds an insignificant improvement under these conditions since it can easily be removed and renewed. Another disadvantage of the known laminating processes is that the foil attached to the paper can be removed by heating or by chemical means.

It is an object of the present invention to enclose an information carrier such as, for example, a credit card or an identification card, in a transparent foil in such a manner that the whole surface of the information carrier is not accessible without destruction of the carrier and cannot therefore be tampered with.

The problem according to the invention is solved by a process for the production of tamperproof documents by laminating an information carrier on one or both sides with foils, at least one of which is transparent, and the process is characterised in that the foil has an adhesive layer consisting of a mass which is hardened by radical cross-linking, and the foil is laminated to one or both sides of the information carrier in such a manner that the adhesive layer is brought into contact with the information carrier, and the laminate is hardened.

Hardening of the adhesive layer of the laminate is effected by means of high energy radiation, initiators which can be activated by UV light or initiators activated by heat or by accelerators.

The adhesive layer used according to the invention contains, as substances which can be hardened by radical cross-linking, ethylenically unsaturated, monomeric oligomeric or polymeric compounds, mainly $\alpha,\beta$-unsaturated compounds or compounds containing vinyl groups, and in particular compounds containing acrylate and/or methacrylate groups.

When acrylic compounds are referred to in the following test, this should be understood to include methacrylic compounds.

According to a preferred embodiment, ethylenically unsaturated oligomeric or polymeric compounds capable of being hardened by radical cross-linking are used, in particular those based on polyesters, $\alpha,\beta$-unsaturated polyesters, polyethers, polyepoxides, polyurethanes, urethane modified polyepoxides, urethane modified polyester, urethane modified polyethers and unsaturated polymers.

The following are mentioned as examples of compounds capable of radical cross-linking which are particularly suitable for the process of the invention:

I—Reaction products of polyisocyanates with hydroxyalkyl acrylates and optionally with polyols which may contain from 0.01 to 10% by weight, based on the reaction product, preferably from 0.1 to 5% by weight of organically bound sulphur in the form of thio and/or dithio groups.

The reaction products preferably consist of:

(A) 1 gram equivalent of isocyanate of a polyisocyanate having at least two, e.g. from 2 to 4 in particular 2 isocyanate groups per molecule, (B) from 0 to 0.7 gram equivalents of hydroxyl of a polyol having at least 2, in particular from 2 to 6 hydroxyl groups per molecule (suitable polyols have been described in German Offenlegungsschrift No. 2,737,406), (C) from 0.01 to 1.0 gram equivalent of hydroxyl of a hydroxy alkyl acrylate having at least 2, in particular from 2 to 4 carbon atoms in the alkyl group and (D) optionally from 0.01 to 0.3 gram equivalents of hydroxyl of a polyol containing thio or dithio groups or thio and dithio groups and having at least 2, in particular from 2 to 4 hydroxyl groups per molecule;

wherein the sum of hydroxyl gram equivalents B to D is from 1 to 1.2 and the quantity of organically bound sulphur from the thio and dithio groups may be from 0 to 10% by weight, in particular from 0.1 to 5% by weight, based on the reaction product.

The reaction products and their preparation have been described in detail in German Auslegeschrift No. 1,644,797; British Pat. No. 743,514; U.S. Pat. No. 3,297,745 and German Offenlegungsschrift No. 2,737,406.

The reaction products may be used in admixture with monofunctional and/or polyfunctional vinyl monomers; information on this possibility is given in German Offenlegungsschrift No. 2,737,406.

II. Reaction products of polyepoxides having more than one epoxide group (e.g. 2.3 epoxypropyl groups) per molecule, preferably from 2 to 6, in particular from 2 to 3 epoxide groups, with acrylic or methacrylic acid.

The preparation is carried out by known methods of reacting the polyepoxide with (meth)acrylic acid or mixtures thereof, for example at 40° to 100° C., optionally in the presence of about 0.01 to 3% by weight, based on the quantity of epoxide plus acid, of catalysts which accelerate the reaction, such as tertiary amines, alkaline metal hydroxides or alkali metal salts of organic carboxylic acids (see U.S. Pat. Nos. 2,456,408; 2,575,440 and 2,698,308).

A detailed description of these reaction products is given in German Offenlegungsschrift No. 2,349,979.

III. Urethanised reaction products of polyepoxides have been described, e.g. in German Offenlegungsschrift No. 2,164,386. Examples of such compounds include urethane resins containing vinyl and optionally carboxyl groups obtained from polyepoxides having more than one 1,2-epoxide group per molecule, α,β-monoolefinically unsaturated carboxylic acids, isocyanates and optionally cyclic dicarboxylic acid anhydrides.

The urethane resins are obtained by first reacting the polyepoxide with acrylic and/or methacrylic acid so that from 60 to 100% of the 1,2-epoxide groups present are converted into β-hydroxyacrylic or β-hydroxymethacrylic acid ester groups and then reacting the corresponding hydroxyl groups with an isocyanate so that from 30 to 90% of the hydroxyl groups present in the β-hydroxyacrylic or β-hydroxymethacrylic acid esters are converted into the corresponding urethanes, and then optionally reacting the hydroxyl groups still present with a cyclic dicarboxylic acid anhydride.

The compounds and their preparation have been described in detail in German Offenlegungsschrift No. 2,557,408.

Further examples of urethanised reaction products of polyepoxides include those of 1,2-polyepoxides and olefinically unsaturated carboxylic acids consisting of (A) an epoxyacrylate optained by reaction (1) of a diglycidyl ester of a hydroxyphthalic acid or (2) of a polyglycidyl ether of polyvalent phenols, in particular bisphenol A, with acrylic or methacrylic acid or mixtures thereof such that from 90 to 100% of the 1,2-epoxide groups are esterified with methacrylic acid or acrylic acid, and (B) hexamethylene diisocyanate, cyclohexane-1,4-diisocyanate, tolylene-2,4- and 2,6-diisocyanate and mixtures thereof, isophorone diisocyanate (1-isocyanatomethyl-5-isocyanato-1,3,3-trimethylcyclohexane), phorone diisocyanate (2,2,4- and 2,4,4-trimethyl-hexamethylene diisocyanate-1,6), 1,5-naphthalene diisocyanate, 1,3-cyclopentylene diisocyanate, m- and p-phenylene diisocyanate, 2,4,6-tolylene triisocyanate, 4,4',4"-triphenylmethane triisocyanate, 1,3- and 1,4-xylylene diisocyanate, 3,3'-dimethyl-4,4'-diphenylmethane diisocyanate, 4,4'-diphenylmethane-diisocyanate, 3,3'-dimethyl-bisphenylene-diisocyanate, 4,4'-bisphenylene-diisocyanate, durene diisocyanate, 1-phenoxy-2,4'-phenylenediisocyanate, 1-tert.-butyl-2,4-phenylene diisocyanate, methylene-bis-4,4'-cyclo-hexyl-diisocyanate, 1-chloro-2,4-phenylenediisocyanate or 4,4'-diphenylether diisocyanate, 2 gram equivalents of reaction product A being reacted with from 0.1 to 0.9 mol, preferably from 0.5 to 0.9 mol of isocyanate.

The reaction products and their preparation have been described in detail in German Offenlegungsschriften Nos. 2,841,880; 2,164,386 and 2,557,408.

IV. Reaction products of a polyepoxide having more than one epoxide group per molecule, in which at least 60% of the epoxide groups have been reacted (A) with from 0.01 to 0.6 thio equivalents, based on 1 epoxide equivalent, of hydrogen sulphide, an aliphatic or cycloaliphatic, aromatic or araliphatic dithiol or polythiol, or a mixture of the aforesaid sulphur compounds, and subsequently (B) with from 0.99 to 0.4 carboxyl equivalents, based on 1 epoxide equivalent, of acrylic or methacrylic acid or a mixture of acrylic and methacrylic acid.

By "polyepoxides" are understood in the present context compounds which contain more than one epoxide group (e.g. 2.3 epoxypropyl groups) per molecule, preferably from 1.6 to 6, in particular from 1.6 to 3 epoxide groups. Epoxide equivalent also indicates the quantity in grams of an epoxide compound containing one epoxide group.

The reaction products and the method of preparing them have been fully described in German Offenlegungsschrift No. 2,533,125.

V. Reaction products of the polyepoxide having more than one epoxide group per molecule in which at least 60% of the epoxide groups have been reacted (A) with from 0.01 to 0.5 amino equivalents, based on 1 epoxide equivalent, of ammonia or of an aliphatic or cycloaliphatic primary or secondary amine or of a mixture of the above mentioned nitrogen compounds, and thereafter (B) with from 0.99 to 0.5 carboxyl equivalents, based on 1 epoxide equivalent, of acrylic or methacrylic acid or of a mixture of acrylic acid methacrylic acid.

By "polyepoxides" are meant in this context compounds containing more than one epoxide group (e.g. 2.3 epoxpropyl groups) per molecule, preferably from 1.6 to 6, in particular from 1.6 to 3 epoxide groups. One epoxide equivalent is the quantity of an epoxide in grams containing one epoxide group.

A detailed description of the reaction products and their preparation may be found in German Offenlegungsschrift No. 2,429,527.

The modified polyepoxides described under IV and V may also be urethanised as described under III.

VI. Polyesters and polyethers esterified with ethylenically unsaturated groups.

Examples include esterification products of hydroxyl polyesters or hydroxypolyethers with acrylic and/or methacrylic acid.

Suitable polyesters and polyethers containing hydroxyl groups have been described in German Offenlegungsschrift No. 2,607,998.

Examples of polyesters esterified with ethylenically unsaturated groups are given in German Offenlegungsschrift No. 2,838,691.

VII. α,β-Unsaturated polyester resins are also suitable.

α,β-Ethylenically unsaturated polyesters include, for the purpose of this invention, the usual polycondensation products of at least one α,β-ethylenically unsaturated dicarboxylic acid generally having 4 to 5 carbon atoms or ester forming derivatives thereof, which may be mixed with up to 90 mol %, based on the unsaturated acid components, of at least one aliphatic saturated dicarboxylic acid having from 4 to 10 carbon atoms or at least one cycloaliphatic dicarboxylic acid having from 8 to 10 carbon atoms or ester forming derivatives thereof with at least one polyhydroxyl compound, in particular a dihydroxyl compound having from 2 to 8 carbon atoms, in other words polyesters such as those described by J. Bjorksten et al in "Polyesters and their Applications", Reinhold Publishing Corp., New York 1956.

Examples of preferred unsaturated dicarboxylic acids or their derivatives include maleic acid, maleic acid anhydride and fumaric acid. Mesaconic acid, citraconic acid, itaconic acid and chloromaleic acid, for example, may also be used. Examples of aliphatic saturated and cycloaliphatic dicarboxylic acids and their derivatives which may be used include phthalic acid, phthalic acid anhydride, isophthalic acid, terephthalic acid, hexahydric and tetrahydric phthalic acid and anhydrides thereof, endomethylene tetrahydrophthalic acid and its anhydride, succinic acid, succinic acid anhydride and succinic acid esters and chlorides, adipic acid and sebacic acid.

The dihydric alcohols used may be ethylene glycol, propane-1,2-diol, propane-1,3-diol, diethylene glycol, dipropylene glycol, butane-1,3-diol, butane-1,4-diol, neopentyglycol, hexane-1,6-diol, 2,2-bis-(4-hydroxycyclohexyl)-propane, bis-hydroxyalkylated bisphenol A, perhydrobisphenol and others. Ethylene glycol, propane-1,2-diol, diethylene glycol and dipropylene glycol are preferably used.

Further modifications may be obtained by the incorporation of up to 10 mol %, based on the alcohol or acid components, of monohydric, trihydric acid tetrahydric alcohols having from 1 to 6 carbon atoms, such as methanol, ethanol, butanol, allyl alcohol, benzyl alcohol, cyclohexanol and tetrahydrofurfuryl alcohol, trimethylolpropane, glycerol and pentaerythritol as well as mono-, di- and triallylethers and benzyl ethers of trihydric acid higher hydric alcohols having from 3 to 6 carbon atoms according to German Auslegeschrift No. 1,024,654, as well as by the incorporation of monobasic acids such as benzoic acid or long chain unsatuated fatty acids such as oleic acid, linoleic fatty acid and ricinene fatty acid.

The acid numbers of the polyesters should be from 1 to 100, preferably from 20 to 70, the hydroxyl numbers from 10 to 150, preferably from 20 to 100, and the molecular weights $M_n$ determined as numerical averages should be within the range of about 500 to 5000, preferably about 1000 to 3000 (determined by vapour pressure osmometry in dioxane and actone; if different values are obtained, the lower is regarded as the correct value).

The unsaturated polyesters and their preparation have been described in detail, for example in German Auslegeschriften Nos. 1,024,654; 1,054,620 and 2,221,335.

VIII. Masses which have been prepared by the polymerisation of suitably substituted ethylenically unsaturated, preferably vinylically unsaturated and in particular arylically and/or methacrylically unsaturated compounds in such a manner that the resulting polymers can subsequently be reacted on their substituents with ethylenic, preferably vinylic and in particular acrylic and/or methacrylic derivatives are also suitable. The unsaturated copolymers obtained and methods of preparing them have been described in detail, for example in German Offenlegungsschrift No. 1,964,547.

The compounds mentioned under VI. and VIII. may, if they have the necessary hydroxyl number, be urethanised as under III. if desired.

Mixtures of the compounds mentioned under I. to VIII. may, of course, also be used.

The adhesive layer used according to the invention may also consist of monomers capable of being hardened by radical cross-linking, in particular those having a sufficiently high boiling point, of about 100° C. or higher.

The hardenable masses used for the adhesive layer may be monomers capable of radical cross-linking mixed with the oligomers or polymers mentioned above and/or with thermoplasts not capable of radical cross-linking, which are used as film formers.

The following are examples of suitable monomers for this purpose:

(1) Esters of acrylic or methacrylic acid and aliphatic $C_1$–$C_8$, cycloaliphatic $C_5$–$C_6$ or araliphatic $C_7$–$C_8$ monohydric alcohols; for example, methyl acrylate, ethyl acrylate, n-propyl acrylate, n-butyl acrylate, methyl hexyl acrylate, 2-ethylacrylate and the corresponding methacrylic acid esters; cyclopentylacrylate, cyclohexyl acrylate and the corresponding methacrylic acid esters; benzyl acrylate, $\beta$-phenylethylacrylate and the corresponding methacrylic acid esters;

(2) Hydroxyalkyl esters of acrylic or methacrylic acid having from 2 to 4 carbon atoms in the alcohol components, such as hydroxyethylacrylate, 2-hydroxypropylacrylate, 3-hydroxypropylacrylate, 2-hydroxybutylacrylate, 4-hydroxybutylacrylate and the corresponding methacrylic acid esters;

(3) Di- and polyacrylates and di- and polymethacrylates of diols and polyols having 3 or 4 hydroxyl groups which may be alkoxylated, preferably ethoxylated or propoxylated, such as ethylene glycol diacrylate, propane diol-1,3-diacrylate, butanediol-1,4-diacrylate, hexanediol-1,6-diacrylate, trimethylolpropane triacrylate, pentaerythritol triacrylate and tetracrylate and the corresponding methacrylate; also di(meth)acrylates of polyether glycols of glycol, propanediol-(1,3) and butanediol-(1,4);

(4) aromatic vinyl and divinyl compounds such as styrene, methylstyrene and divinylstyrene;

(5) N-methylolacrylamide and N-methylolmethacrylamide and the corresponding N-methylolalkylethers having from 1 to 4 carbon atoms in the alkylether group and corresponding N-methylolallylethers, in particular N-methoxymethyl(meth)acrylamide, N-butoxymethyl(meth)acrylamide and N-allyloxymethyl(meth)acrylamide;

(6) vinyl alkyl ethers having from 1 to 4 carbon atoms in the alkyl group, such as vinyl methyl ether, vinyl ethyl ether, vinyl propyl ether and vinyl butyl ether;

(7) trimethylolpropane diallylether mono(meth)acrylate, vinyl pyridine, N-vinyl carbazole, triallylphosphate, triallylisocyanurate, N-vinylpyrrolidone, etc.

Mixtures of one or more of the above mentioned monomers may also be used.

Mixtures of the above mentioned monomers with oligomers or polymers or film forming thermoplasts, can be influenced in their properties by the proportions of the individual components. Liquid mixtures contain a relatively high proportion of monomers. If the mixtures to be hardened by radical cross-linking are required to be highly viscous, gel-like or solid substances, the proportion of monomers will be reduced accordingly.

The following are examples of suitable film formers:

1. Copolyesters prepared from the reaction product of a polymethylene glycol having the formula $HO(CH_2)_nOH$, in which the value of n is from 2 to 10, and (1) hexahydroterephthalic acid, sebacic acid and terephthalic acid, (2) terephthalic acid, isophthalic acid and sebacic acid, (3) terephthalic acid and sebacic acid, (4) terephthalic acid and isophthalic acid and (5) mixtures of the copolyesters prepared from the above mentioned glycols and (i) terephthalic acid, isophthalic acid and sebacic acid and (ii) terephthalic acid, isophthalic acid, sebacic acid and adipic acid;

2. Polyamides such as, for example, N-methoxymethyl polyhexamethylene-adipic acid amide;
3. Vinylidene chloride copolymers, e.g. copolymers of vinylidene chloride and acrylonitrile, of vinylidene chloride and methyl acrylate and of vinylidene chloride and vinyl acetate;
4. Ethylene/vinyl acetate copolymers;
5. Cellulose ethers, e.g. methyl cellulose, ethyl cellulose and benzyl cellulose;
6. Polyethylene;
7. Synthetic rubbers, e.g. butadiene/acrylonitrile copolymers and chloro-2-butadiene-1,3 copolymers;
8. Cellulose esters, e.g. cellulose acetate, cellulose acetate succinate and cellulose acetobutyrate;
9. Polyvinyl esters, e.g. polyvinyl acetate-acrylate, polyvinyl acetate-methacrylate and polyvinyl acetate;
10. Polyacrylate and -alkylpolyacrylate esters, e.g. polymethacrylate and polyethylmethacrylate;
11. High molecular weight polyethylene oxides and polyglycols having an average molecular weight of approximately 4000 to 1,000,000;
12. Polyvinyl chloride and vinyl chloride copolymers, e.g. polyvinyl chloride acetate;
13. Polyvinyl acetals, e.g. polyvinyl butyrate and polyvinyl formal;
14. Polyformaldehydes;
15. Polyurethanes;
16. Polycarbonates; and
17. Polystyrenes.

Suitable mixtures have been described, for example, in U.S. Pat. Nos. 2,760,863; 3,060,026; 3,261,686 and 3,380,831.

The adhesive layer according to the invention may be cross-linked by means of high energy radiation such as UV light, electron rays or gamma rays. When UV-light is used, the layer is exposed to this light in the presence of photo-initiatos.

The photoinitiators may be the usual compounds used for this purpose such as, for example, benzophenone and aromatic ketone compounds derived from benzophenone in general, such as alkylbenzophenones, halogen methylated benzophenones according to German Offenlegungsschrift No. 1,949,010, Michlers ketone, anthrone and halogenated benzophenones. Benzoin and its derivatives are also suitable, for example those described in German Offenlegungsschriften Nos. 1,769,168; 1,769,853; 1,769,854; 1,807,297; 1,807,301 and 1,919,678 and German Auslegeschrift No. 1,694,149. Anthraquinone and numerous of its derivatives are also effective photoinitiatos; for example, β-methylanthraquinone, tert.-butyl anthraquinone and anthraquinone carboxylic acid esters; oxime esters according to German Offenlegungsschrift No. 1,795,089 and phenyl glyoxylic acid esters according to German Offenlegungsschrift No. 2,825,955 are also suitable.

Benzyl dimethylketal, benzoin isopropylether and the benzophenone/amine system as described in U.S. Pat. No. 3,759,807 are particularly suitable photoinitiators.

The most suitable photoinitiators for any given system which is to be photo cross-linked can be determined by a few simple laboratory rests.

The adhesive layer according to the invention may also be cross-linked by the addition of polymerisation initiators which when activated by heat or accelerators release a radical polymerisation, i.e. polymerisation effected by so-called external radical formers. Commonly used polymerisation initiators have been described for example in Wagner/Sax. Lackkunstharze, in the chapter entitled "Ungesättigte Polyesterharze", 5th Edition, publishers Carl Hauser Verlag, Stuttgart 1971; Ullmanns Ezyklopädie der technischen Chemie, Volume 13, 3rd Edition; Houben-Weyl, "Methoden der organischen Chemie", publishers Georg Thieme Verlag, Stuttgart 1961, Volume 14/1, pages 216 et weq and 229 et seq; and Brandrup/Immergut, Polymer Handbook, John Wiley & Sons, New York, 2nd Edition 1975.

The following are examples of conventional polymerisation initiators: Acyl peroxides such as diacetyl peroxide, dibenzoyl peroxide, di-p-dichlorobenzoyl peroxide and benzoyl peroxide; peroxidic esters such as tert.-butyl peroxyacetate, tert.-butyl peroxybenzoate, tert.-butyl peroctoate, dicyclohexyl peroxycarbonate and 2,5-dimethylhexane-2,5-diperoctoate; alkyl peroxides such as bis-(ter.-butyl peroxybutane), dicumyl peroxide, tert.-butyl cumyl peroxide, tert.-butyl peroxide, and lauroyl peroxide; hydroperoxides such as cumene hydroperoxide, tert.-butyl hydroperoxide, cyclohexanone hydroperoxide, methyl ethyl ketone hydroperoxide and methyl isobutyl ketone hydroperoxide, perketals such as 1,1-ditert.-butyl peroxy-3,3,5-trimethylcyclohexane; ketone peroxides such as cyclohexanone peroxide and ethyl methyl ketone peroxide, azo compounds such as azoisobutyrodinitrile, and acetyl acetone peroxide.

Non-peroxidic polymerisation initiators of the C-C-splitting type ($\alpha,\alpha,\alpha',\alpha'$-tetrasubstituted ethanes) such as those described in German Auslegeschriften Nos. 1,216,877 and 1,219,224 and Germn Offenlegungsschriften Nos. 2,615,039; 2,164,482; 2,625,027; 2,131,623; 2,656,782; 2,632,294; 2,853,938 and 2,909,951 and in Kunststoffe 68 (1978) page 593 et seq and Kunststoffe 66 (1976) page 688 et seq are also suitable.

The following are specific examples: Acetophenone pinacol; benzopinacol; 3,4-diphenyl-3,4-dimethylhexane; 1,2-dichloro-tetraphenylethane, tetraphenylsuccinic acid dinitrile, 1,2-dicyano-1,2-diphenylsuccinic acid dinitrile; 1,2-dicyano-1,2-diphenylsuccinic acid ester; benzopinacol silylether and benzopinacol alkylether.

The radical polymerisation initiators may be used each on itw own or as mixtures.

Benzopinacol silylether described in German Offenlegungsschrift No. 2,632,294 is particularly preferred.

The qualitatively and quantitatively most suitable polymerisation initiators or mixtures thereof for any given cross-linking system may be determined by a few simple laboratory tests.

If, for example, it is desired to obtain adhesive layers with a high stability in storage, it is preferred to use polymerisation initiators which have a sufficiently high starting temperature. If, on the other hand, cross-linking is to be carried out at relatively low or ambient temperature, polymerization initiators with a lower starting temperature are preferred.

By starting temperature is meant the temperature to which the adhesive compound according to the invention containing polymerisation initiator must be heated to release controlled decomposition of the polymerization initiator for the purpose of cross-linking the adhesive compound.

It may be advantageous to add certain accelerators to increase the reactivity, such as, for example, cobalt or vanadium naphthenates or octoates, tertiary amines, amides, amidines, sulphinic acid, mercaptans or arylphosphinic acid esters. Accelerators such as these have been described, for example, in Wagner/Sarx, Lackkunstharze, 5th Edition, publishers Carl Hanser Verlag, Munich 1971, Chapter entitled "Ungesättigte Polyesterharze", and in German Offenlegungsschrift No. 2,650,173.

It may be advantageous, in order to prevent premature activity of the polymerisation initiators, possibly in conjunction with accelerators, to add the polymerisation initiator and/or the accelerator to the adhesive compounds according to the invention in a microcapsular form.

The polymerisable compounds according to the invention which are to be hardened by radical cross-linking may be protected against premature polymerisation by adding to them, at the stage of their preparation, from 0.001 to 0.1% by weight, based on the whole mixture, of polymerisation inhibitors or antioxidants.

Suitable additives of this type include, for example, phenols and phenol derivatives, particularly sterically hindered phenols which have alkyl substituents with 1 to 6 carbon atoms in both ortho-positions to the phenolic hydroxyl group, amines, preferably secondary arylamines and their derivatives, quinones, copper-(I) salts of organic acids or products of addition of copper-(I) halides to phosphites. The following are specific examples: 4,4'-Bis-(2,6-di-tert.-butyl-phenol); 1,3,5-trimethyl-2,4,6-tris-(3,5-di-tert.-butyl-4-hydroxybenzyl)-benzene; 4,4'-butylidenebis-(6-tert.-butyl-m-cresol); 3,5-di-tert.-butyl-4-hydroxy-benzyl-phosphonic acid diethylester; N,N'-bis-($\beta$-naphthyl)-p-phenylenediamine; N,N'-bis-(1-methylheptyl)-p-phenylene diamine; phenyl-$\beta$-naphthylamine; 4,4'-bis-(,-dimethyl-benzyl)-diphenylamine; 1,3,5-tris-(3,5-di-tert.-butyl-4-hydroxyhydrocinnamoyl)-hexyhydro-s-triazine; hydroquinone; p-benzoquinone; 2,5-di-tert.-butylquinone; toluhydroquinone; p-tert.-butyl pyrocatechol; 3-methylpyrocatechol; 4-ethylpyrocatechol; chloranil; naphthoquinone; copper naphthenate; copper octoate; Cu(I)Cl/triphenylphosphite; Cu(I)Cl/trimethylphosphite; Cu(I)Cl/tris-chloroethylphosphite; Cu(I)Cl/tripropylphosphite and p-nitrosodimethylaniline.

Other suitable stabilizers have been described in "Methoden der organischen Chemie" (Houben-Weyl), 4th Edition, Volume XIV/1, pages 433–452 and 756. publishers Georg Thieme Verlag, Stuttgart, 1961. Particularly suitable stabilizers, for example, are p-benzoquinone and/or hydroquinone monomethyl ether used at a concentration of from 0.001 to 0.05% by weight, based on the whole mixture.

Suitable materials for the foils include e.g. polyolefines such as polyethylene, cellulose esters, polyvinyl acetate, polypropylene, polystyrene, polyvinyl chloride, polyvinylidene chloride, polyvinyl fluoride, polytetrahalogen ethylene and polycarbonates, in particular those based on bisphenol A, and polyesters, in particular those based on polyethylene terephthalate and polybutylene terephthalate, and polyamides, e.g. polyamide-6 or polyamide-66.

So-called composite foil consisting of single foils of the same or differing chemical composition may, of course, also be used. The following are examples: Polyethylene/polyamides, polypropylene/polyamides and polyolefine foils used together with other foil materials such as polyesters, e.g. polyethylene terephthalate.

Suitable foils and composite foils have been described in Ullmanns Encyklopädie der technischen Chemie, 4th Edition, Volume 11, pages 673 et seq.

The thickness of the foils used according to the invention depends on the desired stiffness of the laminate. Total thicknesses of from 10 to 250$\mu$ are generally sufficient.

The surface of the foil to which the compound which is to be hardened by radical cross-linking is applied may be pretreated before being coated with this compound in order to improve the bond between the foil and the compound. This pretreatment ensures uniform application of the compound and increases its adherence. In the case of polyolefines, for example, suitable results are obtained by means of the usual corona treatment.

The adherence of the compound which is to be cross-linked to its supporting foil may, of course, also be strengthened by other measures, e.g. by application of a suitable substrate layer.

Application of the compound hardened by radical cross-linking to the foil may be carried out by the usual methods employed in the lacquer industry, such as spraying, application with rollers or doctor wipers, printing, immersion, centrifuging, flooding, spread coating, brush coating, etc.

The thickness of the adhesive layer, when dry, depends on the particular requirements and the adhesive power of the compound which is to be hardened. Thicknesses of from 2 to 50$\mu$ would generally be sufficient.

The information carrier used for the process according to the invention would generally be made of paper, which may be printed, embossed or written upon or provided with the required information by some other means. The information carrier may also consist of photographic paper or film containing black-and-white or colour photographic records, pictures and/or symbols and/or other information or other identification features. The support layer of such photographic information carriers may consist of the usual materials used in commercial or art photography. The following are examples: Paper, paper treated with reflection layers, polyolefine laminated paper and the usual film supports made e.g. of cellulose triacetate or polyesters, which may be in the form of opaque, pigmented support layers. The photographic emulsion layers or auxiliary layers of such information carriers have the usual compositions of photographic materials.

The surface of the foil to which the compound which is to be hardened by radical cross-linking is applied may be pretreated before being coated with this compound in order to improve the bond between the foil and the compound. This pretreatment ensures uniform application of the compound and increases its adherence. In the case of polyolefines, for example, suitable results are obtained by means of the usual corona treatment.

The adherence of the compound which is to be cross-linked to its supporting foil may, of course, also be strengthened by other measures, e.g. by application of a suitable substrate layer.

Application of the compound hardened by radical cross-linking to the foil may be carried out by the usual methods employed in the lacquer industry, such as spraying, application with rollers or doctor wipers, printing, immersion, centrifuging, flooding, spread coating, brush coating, etc.

The thickness of the adhesive layer, when dry, depends on the particular requirements and the adhesive power of the compound which is to be hardened. Thicknesses of from 2 to 50$\mu$ would generally be sufficient.

The information carrier used for the process according to the invention would generally be made of paper, which may be printed, embossed or written upon or provided with the required information by some other means. The information carrier may also consist of photographic paper or film containing black-and-white or colour photographic records, pictures and/or symbols and/or other information or other identification features. The support layer of such photographic information carries may consist of the usual materials used in commercial or art photography. The following are examples: Paper, paper treated with reflection layer, polyolefine laminated paper and the usual film supports made e.g. of cellulose triacetate or polyesters, which may be in the form of opaque, pigmented support layers. The photographic emulsion layers or auxiliary layers of such information carriers have the usual compositions of photographic materials.

To laminate the foil carrying the compound which is to be hardened by radical cross-linking to the surface of the information carrier, the foil is heated to a temperature of upt o 200° C., preferably up to 120° C. and most preferably to a temperature in the region of from 50° C. to 120° C. The foil is pressed against the surface of information carrier to form a laminate which is free from bubbles and creases. Any pressure beyond that required to achieve this effect is generally not necessary.

Lamination is preferably carried out continuously by bringing the individual information carriers successively to the foil which is supplied from a roll. A laminate is thus obtained in the form of a band from which the parts containing the information may subsequently be punched out, and the welded foil can be removed at a distance of about 1 to 2 mm from the edge of the information carrier, depending on the thickness of the information carrier. This thickness is generally from 50 to 250μ. The information carrier obtained is thus completely enveloped on all sides so that there is no need subsequently to weld the edges.

Discontinuous lamination, using separate sheets of foil, will, of course, produce the same results.

Hardening may be carried out at various stages, depending on the nature and reactivity of the compound which is to be hardened by radical cross-linking, but it is generally carried out after lamination. In some individual cases, it may be advantageous to effect cross-linking before lamination.

The conditions required for hardening the adhesive layers according to the invention depend on the reactivity of the compound which is to be hardened, the polymerisation initiators employed and any accelerators used, if any.

If the laminate to be hardened is to be irradiated, it is suitable to use the usual sources of light for reproduction work, which have an emission in the range of from 2500 to 5000 A, preferably from 3000 to 4000 A. Examples of suitable light sources include carbon arc lamps, xenon lamps, UV fluorescent lamps, low pressure mercury lamps and high pressure mercury lamps which, in addition to visible light, provide a portion of ultraviolet light which is particularly effective for polymerisation. The time of exposure to the light depends on the nature of the light source.

Irradiation may be carried out at room temperature or at elevated temperatures. Exceptionally high bond strengths are obtained if the laminate is heated to a surface temperature of from 50° to 150° C., preferably from 70° to 120° C. before irradiation.

It is generally desirable to adjust the polymerisable compound to the initiator system so that the starting temperature lies within the range of from 50° to 200° C., in particular from 70° to 120° C. (heat hardening).

Cross-linking to the compound used for the adhesive layer according to the invention is generally carried out by heating to a temperature which is equal to or higher than the starting temperature of the polymerisation initiator. Heating of the adhesive compound is therefore generally not necessary if the polymerisation initiator system used is one which initiates polymerisation of the compound of the ambient temperature (cold hardening). If the polymerisation initiator system is used in a microcapsular form, activation of the polymerisation initiator system is effected by destroying the capsules mechanically, e.g. during the laminating process. When this form of adhesive compound according to the invention is used, the application of heat for the purpose of cross-linking may be desirable, depending on the nature of the polymerisation initiator.

The sources of heat used for heat hardening the laminate produced according to the invention may be, for example infrared dark radiators, infra red light radiators, infra red copying radiators, microwave radiators, hot air blowers, heating rollers, heating plates or similar sources of heat. Carbon arc lamps, low pressure mercury lamps and high pressure lamps emitting thermal radiation in addition to a proportion of UV light and visible light are also suitable.

The process according to the invention is particularly suitable for the manufacture of tamperproof plastics coated cards which are used, for example, as credit cards by banks, oil companies, airlines or retail trading companies but which may also be used as company identification cards, voters cards, social security cards or similar identification cards. The lamination produced by the process according to the invention is bonded indissolubly to the enveloped information carrier and thus prevents every attempt at subsequent alteration of the information on the carrier. Once the foil has been applied, it cannot be removed without complete destruction of the information carrier.

The following examples serve to explain the process of the invention in more detail.

Hardenable composition 1

An acrylate containing urethane groups is prepared by the reaction of 222 g of isophorone diisocyanate, 116 g of hydroxyethyl acrylate and 1050 g of polyester diol having a hydroxyl number of 56 which has been prepared by solvent-free condensation of adipic acid and ethylene glycol.

After introduction of all the isocyanate, 0.2 g of tin octoate and 0.15 g of di-tert.-butyl hydroquinone into the reaction vessel, the hydroxyethylacrylate is added dropwise under a stream of dry air at such a rate that the temperature does not rise above 65° C. When the isocyanate content reaches about 12% by weight, the polyesterdiol is added and the reaction mixture is stirred at 60° C. until the isocyanate content is 0.1% by weight. An odourless, colourless, viscous resin is obtained.

Hardenable composition 2

75 g of the composition from Example 1 are mixed with 25 g of tetraoxylated trimethylolpropane trisacrylate.

Hardenable composition 3

A polyester acrylate is obtained by azeitriouc distillation of a polyester which has been prepared by solvent-free condensation and acrylic acid.

166 g of phthalic acid, 292 g of adipic acid, 275 g of trimethylolpropane and 127 g of ethylene glycol are heated slowly to a temperature of 180° to 220° C. under a stream of nitrogen. When an acid number of 8 has been reached (mg KOH per g of substance), the reaction mixture is cooled and 460 g of toluene, 245 g of acrylic acid, 10 g of p-toluene sulphonic acid, 1 g of p-methoxyphenol and 1.5 g of di-tert.-butylhydroquinone are added. Water is then removed azeotropocally under a stream of air. When the acid number is below 15, the solvent is distilled off under vacuum and the residue is desorbed for one hour under a stream of air at about 10 Torr and 80° C. A colourless, odourless resin is obtained.

Hardenable composition 4

75 g of the adhesive layer composition from Example 3 are mixed with 25 g of hexanediol bisacrylate.

Hardenable composition 5

A solution of 70 g of tetraethoxylated trimethylolpropane-trisacrylate and 30 g of polyvinyl acetate (calculated molecular weight 370,000) is prepared.

Hardenable composition 6

An unsaturated polyester is prepared by the usual method of solvent-free condensation at 160° to 180° C. from 2320 g of fumaric acid, 4519 g of propylene glycol, 1440 g of diethyleneglycol, 940 g of trimethylolpropane diallyl ether and 430 g of diethylene glycol monobutyl ether. A highly viscous, odourless resin is obtained.

Hardenable composition 7

65 g of the adhesive layer composition from Example 6 are mixed with 35 g of styrene.

EXAMPLE 1

100 g of each of the compositions 1 to 7 which are to be hardened by radical cross-linking are mixed with 5 g of benzoyl peroxide and 50 g of ethyl acetate. The resulting solutions are applied by means of coil or wore on a metal rod to a polyethylene foil which has been subjected to a corona discharge. A layer from 15 to 20 μm in thickness is obtained after evaporation of the solvent.

The resulting foils are laminated in one case to one side of a document made of art printing paper and in the other case to both sides of a paper document bearing a recording on a photographic layer, using in each case a commercial laminator at a roller temperature of 115° C.

The laminates are subsequently placed between two metal plates which have been preheated to 120° C., and they are then stored in a heating apparatus at 120° C. The laminates are cooled after a residence time of 10 minutes in the heating apparatus. On inspection, all of the laminates are found to be well bonded. Any attempt to separate the laminates mechanically or by heat invariably leads to destruction of the information carrier.

EXAMPLE 2

100 g of each of the hardenable compositions 1 to 5 are mixed with 1.5 g of benzyl dimethylketal, 4 g of benzophenone and 50 g of ethyl acetate. The subsequent procedure is as described in Example 1.

Lamination is carried out at a roller temperature of 90° C.

The laminates are subsequently placed on an adjustable conveyor belt to be hardened under a UV radiator (80 Watt per cm at a distance of 8 cm; e.g. a Hanovia radiator). Hardening of the sample containing the document of art paper is carried out under the conditions indicated in Table 1 below and hardening of the sample containing the photographic paper is carried out under the conditions indicated in Table 2.

TABLE 1

| Hardenable composition | Cross-linking conditions |
| --- | --- |
| 1 | 4 m/min |
| 2 | 4 m/min |
| 3 | 2 m/min |
| 4 | 2 m/min |
| 5 | 3 m/min |

TABLE 2

| Hardenable composition | Cross-linking conditions |
| --- | --- |
| 1 | 2 m/min |
| 2 | 2 m/min |
| 3 | 0.5 m/min |
| 4 | 0.5 m/min |
| 5 | 1 m/min |

Any attempt to separate the laminate mechanically or by heat invariably results in destruction of the information carrier (inlet).

Hardenable composition 8

1.9 g of thiodiglycol, 0.25 g of p-methoxyphenol and 72 g of acrylic acid are added to 150 g of bisphenol-A-bisglycidyl ether (epoxide equivalent 190) and the mixture is stirred at a temperature of 70° C. under a stream of dry air until an acid number below 1 (mg KOH per g of substance) is reached. A glass clear, viscous resin is obtained.

Hardenable composition 9

75 g of the hardenable composition 8 are mixed with 25 g of a tetraethoxylated trimethylolpropanetrisacrylate.

Hardenable composition 10

3.8 g of thiodiglycol, 0.25 g of p-methoxyphenol and 144 g of acrylic acid are added to 380 g of bisphenol-A-bisglycidyl ether and stirred at a temperature of 70° C. under a stream of dry air until an acid number below 1 (mg KOH per g of substance) is reached. The reaction mixture is then cooled, 330 g of dichloromethane and 1 g of tin octoate are added, and 84 g of hexamethylene diisocyanate are then added dropwise at 40° C., at such a rate that the temperature does not exceed 40° C. Stirring is continued until the isocyanate content is 0.1% by weight.

Hardenable composition 11

The method of preparation of composition 10 is repeated, but with the addition of 110 g of hexamethylene diisocyanate.

Hardenable composition 12

Preparation of the hardenable composition 10 is repeated, but with the addition of 126 g of hexamethylene diisocyanate.

Hardenable composition 13

3.4 g of thiodiglycol, 0.25 g of p-methoxyphenol and 144 g of acrylic acid are added to 344 g of hexahydrophthalic acid diglycidyl ester (epoxide equivalent 172) and the reaction mixture is stirred at the temperature of 70° C. under a stream of dry air until an acid number below 1 (mg KOH per g of substance) is reached. When the reaction mixture has been cooled to room temperature, 350 g of dichloromethane and 1 g of tin octoate are added, and 158 g of a triisocyanate obtained by the reaction of 3 mol of hexamethylene diisocyanate and 1 mol of water are introduced dropwise at 40° C. The reaction mixture is then stirred until the isocyanate content is 0.1% by weight.

Hardenable composition 14

The preparation of composition 13 is repeated but using 118 g of a reaction product of 2 mol of tolylene diisocyanate and 1 mol of ethylene glycol.

Hardenable composition 15

75 g of the hardenable composition 13 are mixed with 25 g of tetraethoxylated trimethylolpropane trisacrylate.

Hardenable composition 16

70 g of hardenable composition 13 are mixed with 30 g of the adhesive layer composition from Example 3.

Hardenable composition 17

1.9 g of thiodiglycol, 0.25 g of p-methoxyphenol and 86 g of methacrylic acid are added to 190 g of bisphenol-A-bisglycidyl ether (epoxide equivalent 190) and the reaction mixture is stirred at 70° C. under a stream of dry air until an acid number below 1 (KOH per g of substance) is obtained. The reaction mixture is then cooled and 165 g of dichloromethane and 0.5 g of tin octoate are added. 42 g of hexamethylene diisocyanate are added dropwise at 40° C. at such a rate that the temperature does not rise above 40° C. Stirring is continued until the isocyanate content is 0.1% by weight.

EXAMPLE 3

100 g of the hardened compositions 8 to 17 are mixed with 3 g of benzoyl peroxide. The resulting formulations are applied by means of a whirler (300 revs/min) to polyethylene foils which have previously been exposed to a corona discharge. When the layers obtained in this manner are partly dry, those obtained from the hardenable composition 8 and 9 have a slightly tack handle while those obtained from compositions 10 to 17 form a physically dry surface. The coated foils are subsequently laminated to both sides of a photographic paper which carries a recording. Lamination is carried out using a commercial laminator at a roller temperature of 115° C.

The laminates are subsequently placed between two glass plates which have been preheated to 120° C. and are hardened in a heating apparatus at 120° C. After a residence time of 10 minutes in the apparatus, the laminates are cooled. Examination shows that all of the laminates are well bonded. Any attempt to separate the laminates mechanically or by heat result in destruction of the information carrier (inlet).

EXAMPLE 4

The procedure is the same as in Example 3 except that 3 g of a benzpinacol silylether described in Example 1 of German Offenlegungsschrift No. 2,632,294 is used as polymerisation initiator. Examination shows that all of the laminates are well bonded. Any attempt to separate the laminates mechanically or by heat results in destruction of the information carrier (inlet).

EXAMPLE 5

An apparatus consisting of a commercial laminator and a heating device equipped with two infra red lamps (250 Watt, Osram Siccalux lamps) is used. Immediately on leaving the laminating rollers of the laminator, the laminates can be passed through the heating devise so that both sides of the laminator are exposed to the radiators at a distance of 5 cm.

The laminator prepared in this apparatus contains a photographic paper carrying information. A polyethylene foil which has been exposed to a corona discharge and then coated as described in Examples 3 and 4 with the hardenable composition indicated in Table 3 below is laminated to both sides of the information carrier at a roller temperature of 115° C. and hardened. Table 3 gives the number of passages through the apparatus at a feed rate of 0.5 m/min required to produce a perfect bond between the information carrier and the laminating foil.

TABLE 3

| Hardenable composition | Initiator | Number of passages |
|---|---|---|
| 9 | Benzoyl peroxide | 3–4 |
| 9 | Benzpinacol silyl ether according to Example 19 | 3 |
| 16 | Benzoyl peroxide | 3–4 |
| 16 | Benzpinacol silyl ether according to Example 19 | 2–3 |

Any attempt to separate the laminate mechanically, chemically or by heat invariably leads to destruction of the information carrier (inlet).

EXAMPLE 6

To test the resistance of the laminates prepared according to Example 5 against treatment with solvents, the laminates are immersed, in each case for one hour at 50° C., in chloroform, hexane, trichloroethylene, acetone, 5% sulphuric acid and 5% sodium hydroxide. In none of the samples is any damage or separation of the bond between laminating foil and information carrier observed.

EXAMPLE 7

Examples 3 to 6 were repeated but the polyethylene foil was replaced in one case by a composite foil of polyethylene/polyester (50 mm polyethylene, 12 mm polyester) and in another case by a composite foil of polyamide/polyethylene, both foils having the same thickness as the polyethylene foil. After a corona discharge treatment, the hardenable compositions were applied to the polyethylene layer of the composite foil in the manner previously described.

The results were similar to those obtained in Examples 3 to 5. A perfect bond was obtained in both cases. Attempts to separate the laminate mechanically chemically or by heat either failed or led to destruction of the information carrier.

EXAMPLE 8

100 g of the hardenable compositions 8 to 16 are mixed with 1.5 g of benzyl dimethylketal and 4 g of benzophenone. The resulting formulations are applied by means of a whirler (300 revs/min) to polyethylene foils which had previously been subjected to a corona discharge. When the layers obtained in this manner have dried on the surface, the hardenable compositions 10 to 16 have a physically dry surface. The foils are then laminated to both sides of a photographic paper on which recordings have been made. Lamination is carried out in a commercial laminator at a roller temperature of from 70° to 100° C.

The individual samples of laminate are irradiated and examined as described below.

EXAMPLE 8a

The laminate samples are placed on a conveyor belt which is adjustable in speed and moved under 5 UV lamps in series (35 Watt/cm, HPQ lamps of Philips) once with their front surface facing the lamps and once with the back surface facing the lamps.

TABLE 4

| Hardenable composition | Irradiation conditions in m/min |
|---|---|
| 8 | 2 |
| 9 | 2 |
| 10 | 2.5 |
| 11 | 3 |
| 12 | 3.5 |
| 13 | 3 |
| 14 | 3 |
| 15 | 3.5 |
| 16 | 3.5 |

EXAMPLE 8b

The samples of laminate are preheated under an infra red lamp (250 Watt, distance 5 cm, Osram Siccalux lamps). The preheating times are shown in Table 5 below. The samples are then placed on a conveyor belt or adjustable speed and moved under a UV lamp (80 Watt/cm) at a distance of 8 cm and a conveyor belt speed of 5 m/min. Table 5 shows the number of passages through the apparatus on each side of the lamine (front and back) required to produce perfect and solvent-resistance bonding of the laminate.

TABLE 5

| Hardenable composition | Preheating time in sec | Number of passages at 5 m/min |
|---|---|---|
| 8 | 12 | 2 |
| 9 | 12 | 2 |
| 10 | 15 | 2 |
| 11 | 20 | 3 |
| 12 | 23 | 3 |
| 13 | 25 | 3 |
| 14 | 25 | 3 |
| 15 | 20 | 2 |
| 16 | 18 | 2 |

Any attempt to separate the laminates prepared in this manner by mechanical means or by heat leads to destruction of the information carrier (inlet). If the preheating treatment indicated in Table 4 is omitted, the number of passages through the apparatus must be increased if a perfect bond is to be obtained.

This is illustrated in the following examples 8c and 8d.

EXAMPLE 8c

A laminate containing hardenable composition 11 is heated to a surface temperature of 95° C. in an infra red radiator and subsequently exposed on each side to a high pressure mercury lamp (125 Watt) from a distance of 8 cm. The time required to reach a fault-free bond is determined. The results are shown in the following Table 5.

EXAMPLE 8d

The procedure is the same as in Example 8c except that preheating is omitted. The results are shown in Table 6.

TABLE 6

| Example | Irradiation time in sec |
|---|---|
| 8c | 20 |
| 8d | 190 |

Both laminates have a perfect bond after irradiation. Attempts to separate the laminate mechanically or by heat invariably leads to destruction of the information carrier (inlet).

EXAMPLE 8e

An apparatus consisting of a commercial laminator and an exposure device equipped with two high pressure mercury lamps (125 Watt each) is used. As soon as the laminates have left the rollers of the laminator, they can be irradiated on both sides at a distance of 8 cm.

A laminate containing a photographic paper carrying information is produced in this apparatus. A polyethylene foil which has been exposed to a corona discharge and then coated with composition 9 which can be hardened by radiation is laminated to both sides of the information carrier at a roller temperature of 100° C. and irradiated. When the sample is fed through the apparatus at a rate of 0.5 m/min, a perfect bond between information carrier and laminating foil is obtained, which cannot be separated either mechanically or by heat without destruction of the information carrier.

EXAMPLE 8f

To test the resistance to solvent treatment of the laminate produced according to Example 8e, the laminate is immersed, in each case for one hour at 50° C., in chloroform, hexane, trichloroethylene, acetone, 5% sulphuric acid and 5% sodium hydroxide. In none of the samples is any damage or opening of the bond between laminating foil and information carrier observed.

EXAMPLE 8g

Examples 8a to 8f were repeated except that the polyethylene foil was replaced in one case by a composite foil of polyethylene/polyester (50 mm polyethylene, 12 mm polyester) and in a second case by a composite foil of polyamide/polyethylene, using layers of the same thickness. The hardenable compositions were applied to the polyethylene layer of the composite foil in the manner described above after a corona discharge treatment. The results were similar to those obtained in Example 8a to 8f. A perfect bond was obtained in both cases. Attempts to dissolve the bond of the laminate mechanically or by heat or chemical means either failed or led to destruction of the information carrier.

We claim:

1. A tamper proof document which is proof against falsification, consisting of an information carrier comprised of a sheet having a photographic emulsion layer carrying information and laminated with at least one transparent foil on one or both sides, wherein the foil carries an adhesive layer containing a polymer hardened by radical cross-linking by high energy radiation or by initiators capable of being activated by UV light or by heat, or by accelerators said adhesive layer bonding the foil to the surface of the information carrier photographic sheet in such a manner that the foil and sheet cannot be separated without destruction of the information carrier sheet and of the information contained in it.

2. A process for the production of a tamper proof information carrier by laminating a sheet and a plastic foil on one or both sides of said sheet, at least one foil being transparent, wherein said sheet has a photographic emulsion layer combined with information and said sheet is provided with at least one of said foils, and the foil is provided with an adhesive layer of a composition containing a substance making the adhesive layer hardenable by (1) radical cross-linking with high energy radiation or (2) an initiator activated by UV light, heat or an accelerator, and the laminating of the foil on one or both sides of the information carrier is performed in such a manner that the hardenable composition comes into contact with the information carrier and the laminate is hardened, whereby the adhesion between the foil and the carrier cannot be separated without destroying information on the carrier.

3. The process as claimed in claim 2, wherein at least one foil which is covered with an adhesive layer consists of polyethylene.

4. Process as claimed in claim 3, wherein the polyethylene foil is subjected to a corona discharge treatment before application of the adhesive layer.

5. Process as claimed in claim 2, wherein the information carrier used is paper or a paper covered with one or more photographic layers.

6. Process as claimed in claim 2 wherein the lamination of the information carrier is carried out at a temperature of up to 150° C.

7. Process as claimed in claim 6, wherein the lamination of the information carrier is carried out at 70° to 120° C.

8. A process for the production of a tamper proof information carrier comprised of a sheet having a plastic foil laminated on one or both sides of said sheet, at least one foil being transparent, wherein said sheet has a photographic emulsion layer combined with the information and said sheet is provided with at least one of said foils, and said foil having an adhesive layer of hardenable composition containing an ethylenically unsaturated monomeric, oligomeric or polymeric compound, optionally a polymerization initiator and optionally an accelerator, wherein said composition includes a substance making the composition hardenable by (1) radical cross-linking with high energy radiation, or (2) an initiator activated by UV light, heat or an accelerator, and the laminating of the foil on one or both sides of the information carrier is performed in such a manner that the hardenable composition comes into contact with the information carrier and the laminate is hardened, whereby the adhesion between the foil and the carrier cannot be separated without destroying information on the carrier.

9. A process as claimed in claims 2 or 8, wherein the hardenable composition includes a monomeric, oligomeric or polymeric compound containing $\alpha,\beta$-unsaturated groups.

10. Process as claimed in claim 9, wherein the hardenable composition includes a monomeric, oligomeric or polymeric compound containing vinyl groups.

11. Process as claimed in claim 10, wherein the hardenable composition includes a monomeric, oligomeric or polymeric compound containing acrylate and/or methacrylate groups.

12. Process as claimed in claim 11, wherein the hardenable composition includes an ethylenically unsaturated oligomeric or polymeric compound based on polyesters, $\alpha,\beta$-unsaturated polyesters, polyethers, polyepoxides, polyurethanes, urethane modified polyethers and unsaturated polymers.

13. Process as claimed in claim 12, wherein the hardenable composition includes a urethane modified (poly)epoxy(meth) acrylate.

14. Process as claimed in claims 2 or 8 wherein the hardenable composition contains a polymeric thermoplastic film former in addition to an ethylenically unsaturated monomeric or oligomeric compound.

15. Process as claimed in claim 14, wherein the hardenable composition contains a monomeric compound having at least one vinylically unsaturated group in addition to the ethylenically unsaturated oligomeric or polymeric compound.

16. Process as claimed in claim 15, wherein the hardenable composition additionally contains a polymeric thermoplastic film former.

17. Process as claimed in claims 2 or 8, wherein said hardening is initiated by a peroxidic polymerisation initiator.

18. Process as claimed in claims 2 or 8, wherein said hardening is initiated by a non-peroxidic polymerisation; initiator of the type $\alpha,\alpha,\alpha',\alpha'$=tertrasubstituted ethanes.

19. Process as claimed in claim 18, wherein said hardening is initiated by a polymerisation initiator having starting temperature in the region of up to 200° C.

20. Process as claimed in claim 19, wherein said hardening is initiated by a polymerisation initiator having a starting temperature in the region of from 60° C. to 150° C.

21. Process as claimed in claim 20, wherein the non-peroxidic polymerisation initiators used are benzpinacol silylethers or benzpinacol alkyl-ethers.

22. Process as claimed in claim 21, wherein the polymerisation initiator is used in a microcapsular form.

23. Process as claimed in claims 2 or 8, wherein the laminate is heated to a temperature of up to 150° C. for hardening with high energy radiation or UV radiation, and the preheated laminate is irradiated.

24. Process as claimed in claims 2 or 8, wherein when initiators activated by heat are used, the laminate is heated to a temperature which is equal to or higher than the starting temperature of the thermally activated polymerisation initiator.

* * * * *